(12) United States Patent　　　(10) Patent No.:　US 12,699,075 B2
Xie　　　　　　　　　　　　　　　(45) Date of Patent:　Aug. 4, 2026

(54) METHOD FOR THE ANALYSIS OF RELATED SUBSTANCES IN CYCLOSPORINE A PREPARATION, AND USE THEREOF

(71) Applicant: ZHAOKE (GUANGZHOU) OPHTHALMOLOGY PHARMACEUTICAL LIMITED, Guangzhou (CN)

(72) Inventor: Zhijun Xie, Guangzhou (CN)

(73) Assignee: ZHAOKE (GUANGZHOU) OPHTHALMOLOGY PHARMACEUTICAL LIMITED, Guangzhou (CN)

(*) Notice: Subject to any disclaimer, the term of this patent is extended or adjusted under 35 U.S.C. 154(b) by 357 days.

(21) Appl. No.: 18/589,473

(22) Filed: Feb. 28, 2024

(65) Prior Publication Data

US 2024/0201140 A1　　Jun. 20, 2024

Related U.S. Application Data

(63) Continuation of application No. PCT/CN2023/093878, filed on May 12, 2023.

(30) Foreign Application Priority Data

Aug. 2, 2022　(CN) ......................... 202210921676.9

(51) Int. Cl.
　B01D 15/42　　　(2006.01)
　G01N 30/06　　　(2006.01)
　　　　(Continued)

(52) U.S. Cl.
　CPC ........... G01N 30/06 (2013.01); B01D 15/424 (2013.01); *G01N 2030/027* (2013.01); *G01N 2030/562* (2013.01)

(58) Field of Classification Search
　CPC ............ G01N 30/06; G01N 2030/027; G01N 2030/562; G01N 30/54; G01N 30/74;
　　　　　　　　(Continued)

(56) References Cited

U.S. PATENT DOCUMENTS

2014/0255380 A1* 9/2014 Garovoy ................. C12Q 1/48
　　　　　　　　　　　　　　　　　　546/307

FOREIGN PATENT DOCUMENTS

CN　　101852781 A　　10/2010
CN　　103735495 B　　7/2016
　　　　　　(Continued)

OTHER PUBLICATIONS

Jin Quyang, et al., Improvement of cyclosporin A determination in whole blood by reversed-phase high-performance liquid chromatography, Biomedical Chromatography, 2003, pp. 404-410, vol. 17.
(Continued)

*Primary Examiner* — David J Bolduc
(74) *Attorney, Agent, or Firm* — Bayramoglu Law Offices LLC

(57)　　　　　　ABSTRACT

A method for analysis of related substances in a cyclosporine A preparation is provided. Chromatographic conditions for the method are as follows:
　a detection wavelength: 210 nm to 230 nm;
　a column temperature: 50° ° C. to 60° C.;
　a flow rate: 0.8 mL/min to 1.5 mL/min;
　a mobile phase A: acetonitrile (0.085% phosphoric acid);
　　a mobile phase B: isopropanol (0.085% phosphoric acid); and a mobile phase C: water (0.1% phosphoric acid).
The method of the present disclosure can well solve problems such as interference of adjuvants and poor separation of many related substances, and also provides an effective
(Continued)

means for formulation of quality standards for related substances in such a preparation.

18 Claims, 3 Drawing Sheets

(51) Int. Cl.
*G01N 30/02* (2006.01)
*G01N 30/56* (2006.01)

(58) Field of Classification Search
CPC ........... G01N 2030/8813; G01N 30/34; G01N 30/88; G01N 30/02; G01N 30/32; G01N 2030/324; B01D 15/424; B01D 15/325; B01D 15/426; Y02A 50/30
See application file for complete search history.

(56) References Cited

FOREIGN PATENT DOCUMENTS

| CN | 113804802 | A | 12/2021 |
|----|-----------|---|---------|
| CN | 115266996 | A | 11/2022 |
| JP | 2005289825 | A | 10/2005 |
| KR | 20040087666 | A | 10/2004 |

OTHER PUBLICATIONS

Feng Huiping, et al., Determination of Cyclosporin A in Human Whole Blood by Improved RP-HPLC, Chinese Modern Applied Pharmacy, 2010, pp. 433-436, vol. 27, No. 5.
Liu Hao, et al., Determination of ciclosporin and degradation products in ciclosporin capsules by HPLC, Chinese Journal of Antibiotics, 2002, pp. 227-231, vol. 27, No. 4.
Pang Wen-Zhe, et al., Simultaneous Determination of the Content and Related Substances of Cyclosporin Injection by HPLC, China Pharmacy, 2015, pp. 399-401, vol. 26, No. 3.
Keys for Enabling Optimum Peptide Characterizations: A Peptide Mapping "How to" Guide, Agilent Technologies, 2014, pp. 2-23.
[H ] G P H 4-1, Basic Technical Guidelines for Research on Chemical Pharmaceutical Preparations, Industry Standards, 2005, pp. 1-16, Basic Technical Guidelines for Research on Chemical Pharmaceutical Preparations Project Research Group.

* cited by examiner

METHOD FOR THE ANALYSIS OF RELATED SUBSTANCES IN CYCLOSPORINE A PREPARATION, AND USE THEREOF

CROSS REFERENCE TO THE RELATED APPLICATIONS

This application is a continuation application of International Application No. PCT/CN2023/093878, filed on May 12, 2023, which is based upon and claims priority to Chinese Patent Application No. 202210921676.9, filed on Aug. 2, 2022, the entire contents of which are incorporated herein by reference.

TECHNICAL FIELD

The present disclosure relates to the fields of analytical chemistry and medicine, particularly to a method for analyzing related substances in a cyclosporine A preparation, and a use thereof.

BACKGROUND

Cyclosporine A (CyA) is a cyclic polypeptide composed of 11 amino acids and is an active metabolite of a fungus in soil. Cyclosporine A is a white or off-white powder with no odor or taste. Cyclosporine A is freely soluble in methanol, ethanol, or acetonitrile, easily soluble in ethyl acetate, soluble in acetone or diethyl ether, and practically insoluble in water. In clinical applications, it is generally dissolved with non-ionic surfactants such as polyethylene glycol castor oil, castor oil, or tween. Six impurities have been identified in cyclosporine A, including cyclosporine B, cyclosporine C, cyclosporine D, cyclosporine H, iso-cyclosporine A, and iso-cyclosporine H.

Dry eye disease (DED), also known as keratoconjunctivitis sicca (KCS), is a general term for a variety of diseases that are characterized by tear film instability, eye discomfort, and/or ocular surface tissue lesions caused by a quality or quantity or kinetic abnormality of tears due to any factor. DED is by far the most common ocular surface disease and is primarily treated with artificial tears.

Cyclosporine A is an immunosuppressant that can inhibit eye inflammation associated with DED, thereby promoting tear production in patients. However, some studies have shown that cyclosporine A can promote the secretion of tears through neurostimulatory effects. In addition, cyclosporine A can inhibit apoptosis of conjunctival goblet cells. Therefore, the mechanism of cyclosporine A to treat DED may include immunosuppression, promotion of tear secretion, and inhibition of conjunctival goblet cell apoptosis.

Currently market available cyclosporine A formulations are mainly injections, emulsions, capsules, etc. In December 2002, the Food and Drug Administration (FDA) of the United States approved a 0.05% cyclosporine ophthalmic emulsion of ALLERGAN (trade name: RESTASIS®). The cyclosporine ophthalmic emulsion is a gel made of cyclosporine A and appropriate amounts of a solubilizing agent, a gel matrix, a humectant, a pH-adjusting agent, and water for injection. The cyclosporine ophthalmic emulsion can be administered once daily at 30 mg/each eye to treat moderate to severe tear-deficient DED.

A general analytical method for cyclosporine A has been introduced in the Chinese Pharmacopoeia, as described below.

a chromatographic column: C18 chromatographic column (150×4.6 mm, 5 μm);
a mobile phase: acetonitrile-water-methyl tert-butyl ether-phosphoric acid (430:520:50:1);
a flow rate: 1.0 mL/min;
a column temperature: 70° C.;
a wavelength: 220 nm; and
an injection volume: 80 μL.

The above detection method has the following problems: There is poor specificity for the simultaneous detection of a plurality of impurities. There is poor separation of impurity peaks from a main peak. Some individual impurity peaks will appear too early, and a blank adjuvant interferes with the detection of an impurity whose peak appears too early. Moreover, after a mixed standard detection, there is very poor separation between the first two impurities (far less than 1.5), and impurity peaks behind a main peak cannot reach baseline separation. Thus, this detection method cannot allow the simultaneous detection of a plurality of known impurities. Therefore, it is necessary to establish a novel detection method for related substances to detect and separate the above 6 known impurities (cyclosporine B, cyclosporine C, cyclosporine D, cyclosporine H, iso-cyclosporine A, and iso-cyclosporine H) and other unknown impurities.

The cyclosporine ophthalmic gel is a modified new drug belonging to class 2.2 chemical drugs. According to the application requirements of class 2.2 chemical drugs and the requirements of the "Basic Technical Guidelines for Research on Chemical Pharmaceutical Preparations", related substances in a cyclosporine A preparation should be very strictly controlled. However, no effective detection method for related substances in a capsule, an injection, or the like has been put forward in patents, pharmacopoeias, bills, or the like inside or outside China. Further, no requirements have been presented for corresponding detection limits, which brings great risks to clinical applications and reduces product quality.

There are currently many references or patents to explore an analysis method for related substances in a cyclosporine A preparation to some extent. Liu Hao et al.[1] use as many as 18 C18 ordinary columns of 14 brands to detect cyclosporine A and degradation products thereof, such as cyclosporine H, iso-cyclosporine A, and iso-cyclosporine H. This method has a specified separation effect and exhibits excellent system applicability and durability. However, this method does not consider the interference of some other impurities and adjuvants (Liu Hao and Qiu Shilin, Determination of Contents of Cyclosporine and Degradation Products thereof in Cyclosporine Capsules by High-Performance Liquid Chromatography (HPLC), Chinese Journal of Antibiotics, 2002, 27, 227-231). Pang Wenzhe et al.[2] test contents of cyclosporine A and related substances in a cyclosporine A injection under the following chromatographic conditions: Merck Hibar® C18, mobile phase: tetrahydrofuran (THF)-0.05 mol/L phosphoric acid solution (45:55, V/V), flow rate: 1.0 mL/min, detection wavelength: 220 nm, column temperature: 75° C., and injection volume: 10 μL. This method exhibits up-to-standard system applicability, specificity, stability, and repeatability. However, this method does not consider the interference of adjuvants such as polyoxyethylene castor oil (Pang Wenzhe, Song Gengshen, Wang Moli, Simultaneous Determination of Contents of Cyclosporine A and Related substances in Cyclosporine A Injection by High-Performance Liquid Chromatography (HPLC), China Pharmacy, 2015, 26, 399-401). How to allow the effective separation of related substances and the elimination of interference by adjuvants during detection has become a major problem that needs to be solved urgently.

Based on the characteristics of a cyclosporine A product, the advantages of a peptide column in the separation of amino acids and peptides (Keys for Enabling Optimum Peptide Characterizations: A Peptide Mapping "How to" Guide, Agilent Technologies, Inc. Printed in the USA Apr. 25, 2014, 5991-2348EN), the present invention introduces peptide columns of various brands for analysis and detection, so as to find an analysis and detection method that can effectively separate related substances and eliminate the interference by adjuvants.

SUMMARY

The present disclosure provides a method for analysis of related substances in a cyclosporine A preparation. The method refers to High-Performance Liquid Chromatography (HPLC), and is conducted under the following conditions:

a chromatographic column: a chromatographic column with octadecylsilane-bonded silica gel as a packing; and mobile phases: a mobile phase A, a mobile phase B, and a mobile phase C.

The mobile phase A is a phosphoric acid-acetonitrile solution in which a concentration of phosphoric acid is 0.05% to 0.1%. For example, in some specific embodiments, the concentration of the phosphoric acid in the phosphoric acid-acetonitrile solution can also be 0.06%, 0.07%, 0.08%, or 0.09%; and in a specific embodiment, the concentration of the phosphoric acid in the phosphoric acid-acetonitrile solution is 0.085%.

The mobile phase B is a phosphoric acid-isopropanol solution in which a concentration of phosphoric acid is 0.05% to 0.1%. For example, in some specific embodiments, the concentration of the phosphoric acid in the phosphoric acid-isopropanol solution can also be 0.06%, 0.07%, 0.08%, or 0.09%; and in a specific embodiment, the concentration of the phosphoric acid in the phosphoric acid-isopropanol solution is 0.085%.

The mobile phase C is a phosphoric acid aqueous solution in which a concentration of phosphoric acid is 0.05% to 0.2%. For example, in some specific embodiments, the concentration of the phosphoric acid in the phosphoric acid aqueous solution can also be 0.06%, 0.07%, 0.08%, or 0.09%; and in a specific embodiment, the concentration of the phosphoric acid in the phosphoric acid aqueous solution is 0.1%.

Further, a detection wavelength for the HPLC is 210 nm to 230 nm. For example, in some specific embodiments, the detection wavelength can also be 211 nm, 212 nm, 213 nm, 214 nm, 215 nm, 216 nm, 217 nm, 218 nm, 219 nm, 220 nm, 221 nm, 222 nm, 223 nm, 224 nm, 225 nm, 226 nm, 227 nm, 228 nm, or 229 nm; and in a specific embodiment, the detection wavelength is 220 nm.

Further, a column temperature for the HPLC is 40° ° C. to 70° C. For example, in some specific embodiments, the column temperature can also be 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., or 69° C.; in a specific embodiment, the column temperature is 50° ° C.; and in another specific embodiment, the column temperature is 60° C.

Further, a flow rate for the HPLC is 0.8 mL/min to 1.5 mL/min. In a specific embodiment, the flow rate is 1.0 mL/min to 1.5 mL/min.

Preferably, the chromatographic column for the HPLC is one or more of a Waters chromatographic column, an Agilent chromatographic column, a Thermo chromatographic column, a Phenomenex chromatographic column, a Shimatsu chromatographic column, or a YMC chromatographic column. In some specific embodiments, the chromatographic column is an Agilent or Phenomenex chromatographic column. In a specific embodiment, the chromatographic column is an Agilent peptide chromatographic column, and preferably, the chromatographic column is an Agilent Zorbax SB-C18 chromatographic column.

Further, the HPLC adopts gradient elution as follows:

0 min to 20 min: a mobile phase includes 50% of the mobile phase A and 50% of the mobile phase C, and a flow rate is 1.00 mL/min;

20 min to 100 min: a mobile phase includes 35% of the mobile phase A, 20% of the mobile phase B, and 45% of the mobile phase C, and a flow rate is 1.50 mL/min; and after 100 min: a mobile phase includes 50% of the mobile phase A and 50% of the mobile phase C, and a flow rate is 1.00 mL/min.

Further, cyclosporine A is an active pharmaceutical ingredient (API) or an active ingredient or API of a preparation.

In some specific embodiments, the related substances include a pharmaceutical adjuvant, and further, the pharmaceutical adjuvant is polyoxyethylene (35) castor oil, castor oil, or Tween. In a specific embodiment, the pharmaceutical adjuvant is polyoxyethylene (35) castor oil.

In some specific embodiments, the related substances include one or more of the 6 known impurities in the cyclosporine A preparation, and the 6 known impurities in the cyclosporine A preparation are cyclosporine B, cyclosporine C, cyclosporine D, cyclosporine H, iso-cyclosporine A, and iso-cyclosporine H, respectively.

The present disclosure also provides a use of the method described above in preparation of a cyclosporine A preparation. Further, the cyclosporine A preparation has a pharmaceutically-acceptable purity. In a specific embodiment, the cyclosporine A preparation is a cyclosporine A ophthalmic gel.

The method of the present disclosure is implemented under the following chromatographic conditions: a chromatographic column: an amino acid/peptide chromatographic column with octadecylsilane-bonded silica gel as a packing (4.6×150 mm, 5 μm); a mobile phase A: acetonitrile (0.085% phosphoric acid); a mobile phase B: isopropanol (0.085% phosphoric acid); a mobile phase C: water (0.1% phosphoric acid); a detection wavelength: 220 nm; a column temperature: 60° C.; and a flow rate: 1.0 mL/min to 1.5 mL/min. The method of the present disclosure can effectively detect and separate the 6 known impurities (cyclosporine B, cyclosporine C, cyclosporine D, cyclosporine H, iso-cyclosporine A, and iso-cyclosporine H) in the cyclosporine A preparation, and can effectively prevent the interference of adjuvants such as polyoxyethylene castor oil. Thus, with the method of the present disclosure, quality standards for detection of related substances in a cyclosporine ophthalmic gel can be established.

DETAILED DESCRIPTION OF THE EMBODIMENTS

Figure 1:
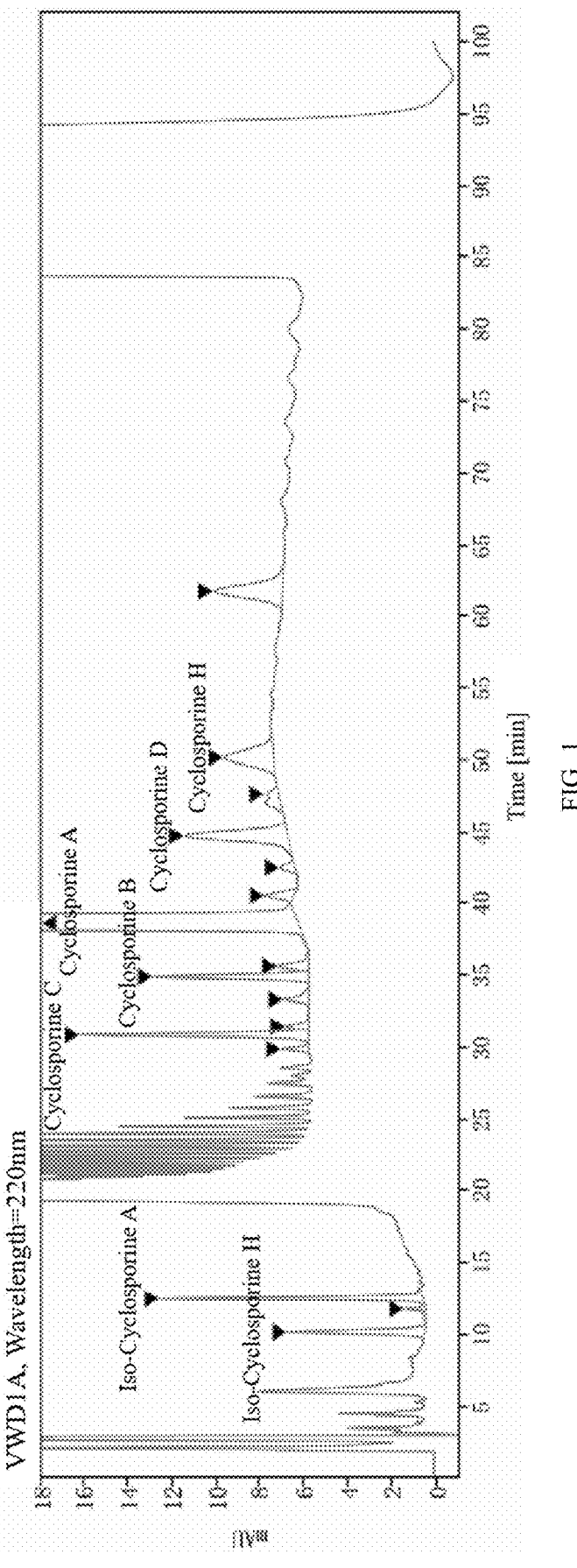
FIG. 1 shows a spectrum of an Agilent chromatographic column in the case where effective separation is allowed after polyoxyethylene (35) castor oil is added (a standard sample with impurities)

The present disclosure discloses a method for analysis of related substances in a cyclosporine A preparation, and those skilled in the art may appropriately improve process parameters with reference to the content of the present disclosure to provide the method. In particular, it should be noted that all similar substitutions and alterations are apparent to those skilled in the art, and all are deemed to be included in the present disclosure. The method of the present disclosure has been described through preferred embodiments, and those skilled in the art can obviously modify or appropriately change and combine the methods and applications described herein without departing from the content, spirit, and scope of the present disclosure to implement and apply the technology of the present disclosure.

To enable those skilled in the art to well understand the technical solutions of the present disclosure, the present disclosure will be further described in detail below with reference to specific embodiments.

In the following examples, a cyclosporine ophthalmic gel is from Zhaoke (Guangzhou) Ophthalmology and has a model of ZK20211001; water is ultrapure water (UPW); and other reagents all are analytical-pure reagents available on the market, unless otherwise specified.

In the following examples, a mixed reference substance solution refers to a mixed solution including various reference substances; and a cyclosporine A ophthalmic gel is prepared with reference to the method described in Example 3 of the patent CN103735495B.

| No. | Name | Source | Batch No. | Purity/potency/specification |
|---|---|---|---|---|
| 1 | Cyclosporine A reference substances | National Institutes for Food and Drug Control | 130495-201904 | 98.8% |
| 2 | Cyclosporine A ophthalmic gel | Self-made | 20200101 | 0.3 g:0.15 mg |
| 3 | Blank adjuvant solution | Self-made | 20200301 | 0.3 g:0 mg |

In the following examples, a blank adjuvant does not include an active ingredient of a drug, and a dosage form, a size, a color, a weight, a smell, and a taste of the blank adjuvant are consistent with those of a test drug, such that the blank adjuvant cannot be identified by a subject. A main adjuvant is polyoxyethylene (35) castor oil (manufacturer: BASF, model: Kolliphor ELP, and batch No.: 85210956P0).

Preparation of Solutions:

(1) Preparation of a blank adjuvant solution: About 2 g of adjuvants in a formula was weighed in total and placed in a 10 mL volumetric flask, and an appropriate amount of a diluent was added to obtain a first mixture; the first mixture was subjected to ultrasonic dissolution and placed at room temperature, 0.1 mL of 10% $CaCl_2$) was added, and a diluent was added to a specified scale to obtain a second mixture;

and the second mixture was thoroughly shaken and then centrifuged at 10,000 rpm for 10 min, and a resulting supernatant was collected for injection.

(2) Preparation of a test sample solution: About 2 g of a cyclosporine ophthalmic gel was weighed and placed in a 10 mL volumetric flask, and an appropriate amount of a diluent was added to obtain a first mixture; the first mixture was subjected to ultrasonic dissolution and placed at room temperature, 0.1 mL of 10% $CaCl_2$) was added, and a diluent was added to a specified scale to obtain a second mixture; and the second mixture was thoroughly shaken and then centrifuged at 10,000 rpm for 10 min, and a resulting supernatant was collected for injection.

(3) Preparation of a mixed reference substance solution: Cyclosporine A, cyclosporine B, cyclosporine C, cyclosporine D, cyclosporine H, iso-cyclosporine A, and iso-cyclosporine H each were accurately weighed at an appropriate amount and placed in 7 appropriate volumetric flasks, respectively; and an appropriate amount of THF was added to each volumetric flask, and resulting mixtures each were subjected to ultrasonic dissolution, then diluted with THE to a specified scale, and thoroughly shaken to obtain 0.1 mg/mL reference substance solutions.

Chromatographic Conditions:

an instrument: Agilent Infinity II a detector: Agilent DAD an Agilent Zorbax SB-C18 chromatographic column, 4.6×150 mm, 5 μm; a detection wavelength: 220 nm; a column temperature: 50° C.; a flow rate: 0.8 mL/min to 1.5 mL/min; a mobile phase A: acetonitrile (0.085% phosphoric acid); a mobile phase B: isopropanol (0.085% phosphoric acid); a mobile phase C: UPW (0.1% phosphoric acid); the test sample solution was mixed with the mixed reference substance solution, and 100 μL of a resulting mixed solution was injected; and gradient elution was conducted with a system of mobile phases specifically shown in Table 1:

TABLE 1

| Elution gradient of Example 1 | | | | |
|---|---|---|---|---|
| Time (min) | Mobile phase A (%) | Mobile phase B (%) | Mobile phase C (%) | Flow rate (mL/min) |
| 0.00 | 50 | 0 | 50 | 1.00 |
| 20.00 | 50 | 0 | 50 | 1.50 |
| 20.01 | 35 | 20 | 45 | 1.50 |
| 100.00 | 35 | 20 | 45 | 1.50 |
| 100.01 | 50 | 0 | 50 | 1.00 |

Test results are shown in FIG. 1, and it can be seen that the method (using an Agilent HPLC binary pump) can effectively separate the related substance, and the polyoxyethylene (35) castor oil added does not interfere with the separation of the related substances.

Example 2

Chromatographic conditions: a chromatographic column: Phenomenex Kinetex C18 250 mm×4.6 mm×5 μm; a mobile phase A: acetonitrile (0.085% phosphoric acid); a mobile phase B: isopropanol (0.085% phosphoric acid); a mobile phase C: UPW (0.1% phosphoric acid); a column temperature: 60° C.; the blank adjuvant solution was mixed with the mixed reference substance solution, and 100 μL of a resulting mixed solution was injected; a flow rate: 1.0 mL/min; a wavelength: 220 nm; an elution gradient was adjusted (as shown in Table 2) for investigation; and a running time: 120 min. 7 peaks normally separated could be detected currently, but when the blank adjuvant solution was detected under the same conditions, the cyclosporine-related substances were greatly affected and could not be effectively separated.

TABLE 2

Elution gradient of Example 2

| Time (min) | Mobile phase A (%) | Mobile phase B (%) | Mobile phase C (%) |
|---|---|---|---|
| 0 | 50 | 0 | 50 |
| 15 | 53 | 0 | 47 |
| 15.01 | 30 | 30 | 40 |
| 120 | 30 | 30 | 40 |

Figure 2:
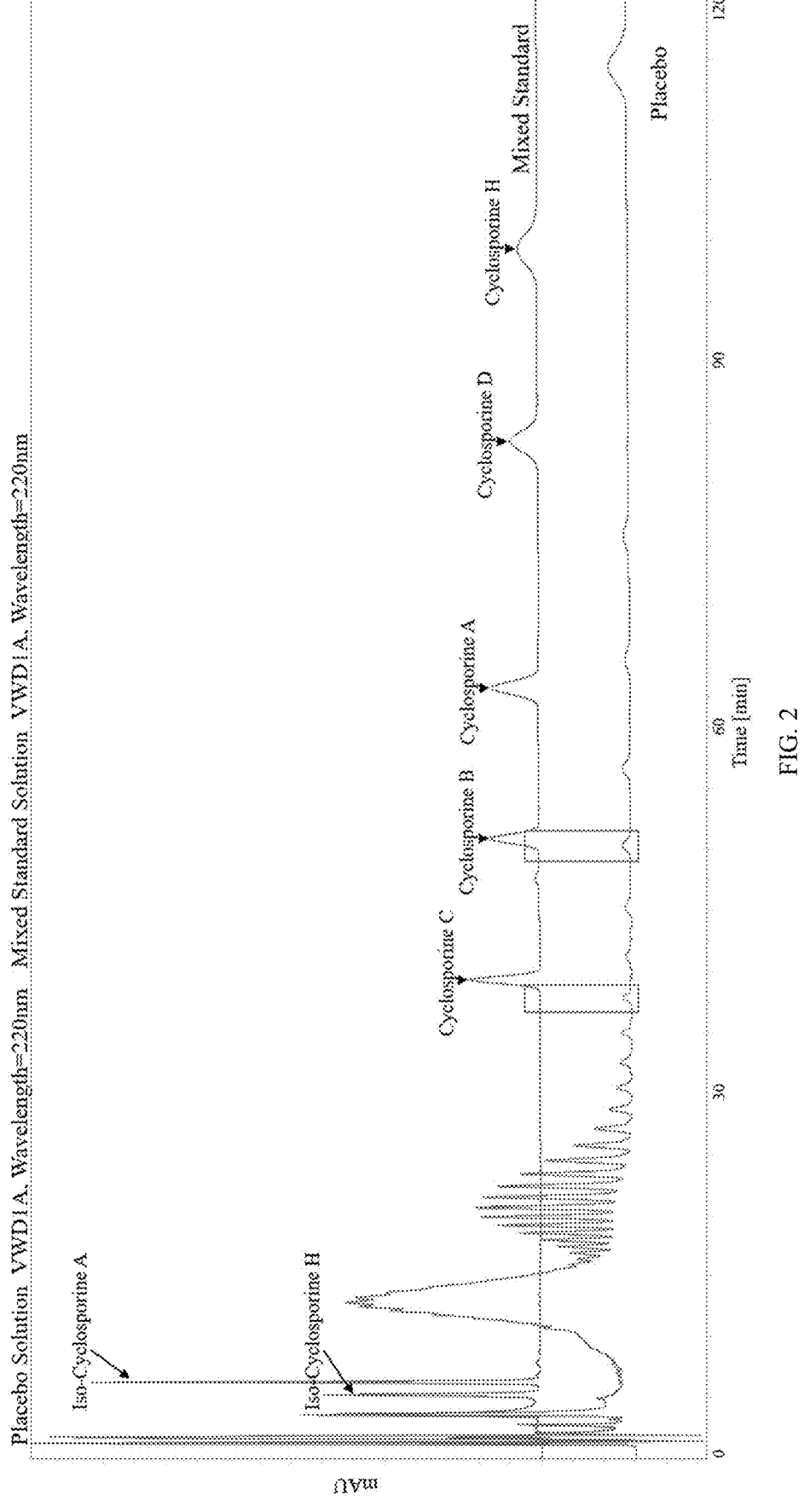
FIG. 2 shows spectra of a Phenomenex chromatographic column in the case where effective separation is not allowed after polyoxyethylene (35) castor oil is added.

Test results are shown in FIG. 2, and it can be seen that the method can effectively separate the related substances, and the polyoxyethylene (35) castor oil added interferes with the separation of the related substances to some extent.

Example 3

Chromatographic conditions: a chromatographic column: Waters Nova-Pak C18 3.9 mm×300 mm×4 μm (YKY-202112-132);

a mobile phase: a mixture of THE, water, and n-propylamine phosphate in a ratio of 400:590:10; isocratic elution; a column temperature: 50° C.; the blank adjuvant solution was mixed with the mixed reference substance solution, and 100 μL of a resulting mixed solution was injected; a flow rate: 1.0 mL/min; and a running time: 60 min.

Figure 3:
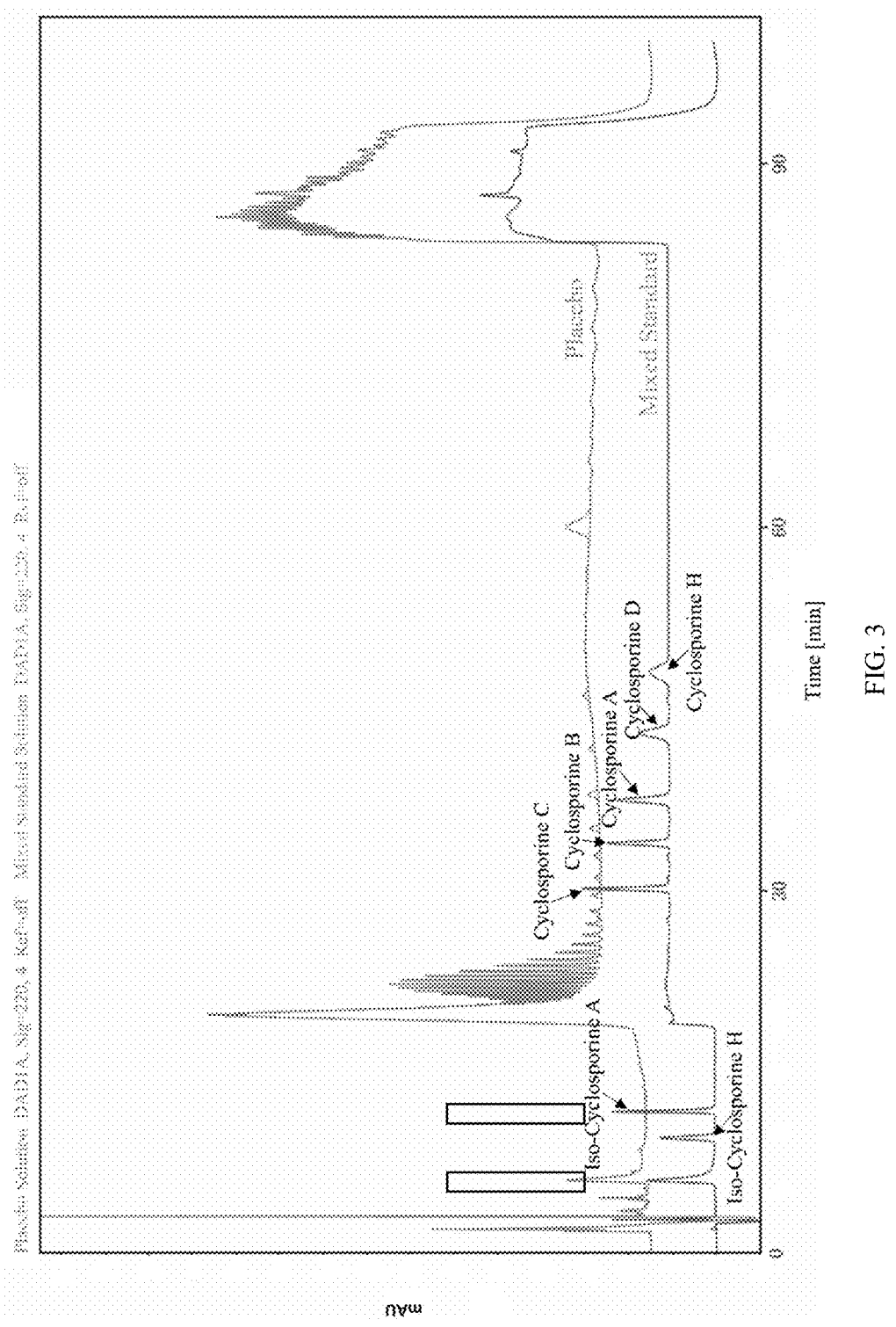
FIG. 3 shows spectra of a Waters chromatographic column in the case where related substances cannot be effectively separated after polyoxyethylene (35) castor oil is added.

Test results are shown in FIG. 3, and it can be seen that a peak of the blank adjuvant solution shifts backwards, and a peak of the subsequent placebo adjuvant shifts forwards, which interferes with cyclosporine A and cyclosporine C.

The above are merely preferred examples of the present disclosure and are not intended to limit the present disclosure, and various changes and modifications can be made by those skilled in the art to the present disclosure. Any modifications, equivalent substitutions, improvements, and the like made within the spirit and principle of the present disclosure should be included within the protection scope of the present disclosure.

What is claimed is:

1. A method for an analysis of related substances in a cyclosporine A preparation, wherein the method refers to high-performance liquid chromatography, and is conducted under the following conditions: a chromatographic column with octadecylsilane-bonded silica gel as a packing; and mobile phases comprising: a mobile phase A, a mobile phase B, and a mobile phase C, wherein the mobile phase A is a phosphoric acid-acetonitrile solution with a concentration of phosphoric acid being 0.05% to 0.1%; the mobile phase B is a phosphoric acid-isopropanol solution with a concentration of phosphoric acid being 0.05% to 0.1%; and the mobile phase C is a phosphoric acid aqueous solution with a concentration of phosphoric acid being 0.05% to 0.2%.

2. The method for the analysis of the related substances in the cyclosporine A preparation according to claim 1, wherein a detection wavelength for the high-performance liquid chromatography is 210 nm to 230 nm.

3. The method for the analysis of the related substances in the cyclosporine A preparation according to claim 1, wherein a column temperature for the high-performance liquid chromatography is 50° C. to 60° C.

4. The method for the analysis of the related substances in the cyclosporine A preparation according to claim 1, wherein a flow rate for the high-performance liquid chromatography is 0.8 mL/min to 1.5 mL/min.

5. The method for the analysis of the related substances in the cyclosporine A preparation according to claim 1, wherein the chromatographic column for the high-performance liquid chromatography is one or more of a Waters chromatographic column, an Agilent chromatographic column, a Thermo chromatographic column, a Phenomenex chromatographic column, a Shimatsu chromatographic column, or a YMC chromatographic column.

6. The method for the analysis of the related substances in the cyclosporine A preparation according to claim 1, wherein the high-performance liquid chromatography adopts a gradient elution as follows:

0 min to 20 min: the mobile phases comprise 50% of the mobile phase A and 50% of the mobile phase C, and a flow rate is 1.00 mL/min;

20 min to 100 min: the mobile phases comprise 35% of the mobile phase A, 20% of the mobile phase B, and 45% of the mobile phase C, and a flow rate is 1.50 mL/min; and after 100 min: the mobile phases comprise 50% of the mobile phase A and 50% of the mobile phase C, and a flow rate is 1.00 mL/min.

7. The method for the analysis of the related substances in the cyclosporine A preparation according to claim 1, wherein the related substances comprise polyoxyethylene (35) castor oil.

8. The method for the analysis of the related substances in the cyclosporine A preparation according to claim 1, wherein the related substances comprise one or more of cyclosporine B, cyclosporine C, cyclosporine D, cyclosporine H, iso-cyclosporine A, and iso-cyclosporine H.

9. The method for the analysis of the related substances in the cyclosporine A preparation according to claim 1, wherein the cyclosporine A preparation is a gel preparation.

10. A method for preparing a cyclosporine A preparation with a pharmaceutically-acceptable purity, comprising using the method for the analysis of the related substances in the cyclosporine A preparation according to claim 1.

11. The method for preparing the cyclosporine A preparation with the pharmaceutically-acceptable purity according to claim 10, wherein in the method for the analysis of the related substances in the cyclosporine A preparation, a detection wavelength for the high-performance liquid chromatography is 210 nm to 230 nm.

12. The method for preparing the cyclosporine A preparation with the pharmaceutically-acceptable purity according to claim 10, wherein in the method for the analysis of the related substances in the cyclosporine A preparation, a column temperature for the high-performance liquid chromatography is 50° ° C. to 60° C.

13. The method for preparing the cyclosporine A preparation with the pharmaceutically-acceptable purity according to claim 10, wherein in the method for the analysis of the related substances in the cyclosporine A preparation, a flow rate for the high-performance liquid chromatography is 0.8 mL/min to 1.5 mL/min.

14. The method for preparing the cyclosporine A preparation with the pharmaceutically-acceptable purity according to claim 10, wherein in the method for the analysis of the related substances in the cyclosporine A preparation, the chromatographic column for the high-performance liquid chromatography is one or more of a Waters chromatographic column, an Agilent chromatographic column, a Thermo chromatographic column, a Phenomenex chromatographic column, a Shimatsu chromatographic column, or a YMC chromatographic column.

15. The method for preparing the cyclosporine A preparation with the pharmaceutically-acceptable purity according to claim 10, wherein in the method for the analysis of the related substances in the cyclosporine A preparation, the high-performance liquid chromatography adopts a gradient elution as follows:

0 min to 20 min: the mobile phases comprise 50% of the mobile phase A and 50% of the mobile phase C, and a flow rate is 1.00 mL/min;

20 min to 100 min: the mobile phases comprise 35% of the mobile phase A, 20% of the mobile phase B, and 45% of the mobile phase C, and a flow rate is 1.50 mL/min; and after 100 min: the mobile phases comprise 50% of the mobile phase A and 50% of the mobile phase C, and a flow rate is 1.00 mL/min.

16. The method for preparing the cyclosporine A preparation with the pharmaceutically-acceptable purity according to claim 10, wherein in the method for the analysis of the related substances in the cyclosporine A preparation, the related substances comprise polyoxyethylene (35) castor oil.

17. The method for preparing the cyclosporine A preparation with the pharmaceutically-acceptable purity according to claim 10, wherein in the method for the analysis of the related substances in the cyclosporine A preparation, the related substances comprise one or more of cyclosporine B, cyclosporine C, cyclosporine D, cyclosporine H, iso-cyclosporine A, and iso-cyclosporine H.

18. The method for preparing the cyclosporine A preparation with the pharmaceutically-acceptable purity according to claim 10, wherein in the method for the analysis of the related substances in the cyclosporine A preparation, the cyclosporine A preparation is a gel preparation.

\* \* \* \* \*